(12) United States Patent
Kuwajima et al.

(10) Patent No.: US 7,814,619 B2
(45) Date of Patent: Oct. 19, 2010

(54) OPENING AND CLOSING DEVICE

(75) Inventors: Hideki Kuwajima, Fukui (JP); Yasuchika Kudo, Fukui (JP)

(73) Assignee: Panasonic Corporation, Osaka (JP)

( * ) Notice: Subject to any disclaimer, the term of this patent is extended or adjusted under 35 U.S.C. 154(b) by 177 days.

(21) Appl. No.: 11/551,379

(22) Filed: Oct. 20, 2006

(65) Prior Publication Data

US 2007/0089272 A1    Apr. 26, 2007

(30) Foreign Application Priority Data

Oct. 21, 2005   (JP)   ............................. 2005-306909
Jul. 21, 2006   (JP)   ............................. 2006-198960

(51) Int. Cl.
*E05F 1/08*   (2006.01)

(52) U.S. Cl. .............................. 16/303; 16/331; 16/332; 16/334; 16/330; 361/679.01; 361/679.3; 361/679.21

(58) Field of Classification Search .................. 16/303, 16/312, 318, 315, 330–334; 455/575.1, 575.3; 379/433.11, 433.07, 434, 440; 361/680, 361/681, 679.01, 679.3, 679.21
See application file for complete search history.

(56) References Cited

U.S. PATENT DOCUMENTS

| | | | |
|---|---|---|---|
| 7,111,361 B2 * | 9/2006 | Li et al. .......................... | 16/284 |
| 7,150,072 B2 * | 12/2006 | Huang et al. .................... | 16/312 |
| 7,328,483 B2 * | 2/2008 | Chen et al. ..................... | 16/303 |
| 7,337,498 B2 * | 3/2008 | Hsieh ........................... | 16/330 |
| 7,373,692 B2 * | 5/2008 | Kfoury .......................... | 16/308 |
| 2003/0153284 A1 * | 8/2003 | Minami et al. ................. | 455/90 |
| 2004/0224730 A1 * | 11/2004 | Sakai et al. ............... | 455/575.3 |
| 2005/0132534 A1 * | 6/2005 | Chen et al. ..................... | 16/324 |
| 2006/0096064 A1 * | 5/2006 | Ma et al. ....................... | 16/303 |
| 2006/0117528 A1 * | 6/2006 | Duan et al. .................... | 16/303 |
| 2006/0123596 A1 * | 6/2006 | Chen et al. ..................... | 16/337 |
| 2006/0174443 A1 * | 8/2006 | Takagi et al. ................... | 16/330 |
| 2008/0128156 A1 * | 6/2008 | Kuwajima et al. ...... | 174/161 R |

FOREIGN PATENT DOCUMENTS

| | | |
|---|---|---|
| CN | 2661993 | 12/2004 |
| JP | 2004-245342 | 9/2004 |

* cited by examiner

*Primary Examiner*—Victor Batson
*Assistant Examiner*—Emily M Morgan
(74) *Attorney, Agent, or Firm*—RatnerPrestia (57) ABSTRACT

An opening and closing device which includes a roughly cylindrical stator, a concavo-convex stator cam provided at an end of the stator, a ring-like rotor rotatably disposed relative to the stator, a rotor cam opposedly protruding from an inner periphery or outer periphery of the rotor, and a spring pushing the rotor against the stator. The rotor cam slides on the concavo-convex stator cam during the opening and closing operations. In this structure, the opening and closing device is openable roughly up to 180°, and a force in the opening direction is applied to a movable housing even when the movable housing is opened not less than 165°. Accordingly, this opening and closing device eliminates wobbling in the opening and closing direction, and ensures reliable opening and closing operations and retention at a predetermined angle.

10 Claims, 11 Drawing Sheets

OPENING AND CLOSING DEVICE

BACKGROUND OF THE INVENTION

1. Field of the Invention

The present invention relates to opening and closing devices used in electronic devices such as mobile phones and personal computers.

2. Background Art

With electronic devices such as mobile phones and personal computers becoming increasingly smaller and lighter, many products are adopting designs that attach a movable housing to a fixed housing in an openable and closable fashion, a so-called folding design. The opening and closing devices used in these electronic devices are also required to ensure further reliable opening and closing operations.

Figure 8A:
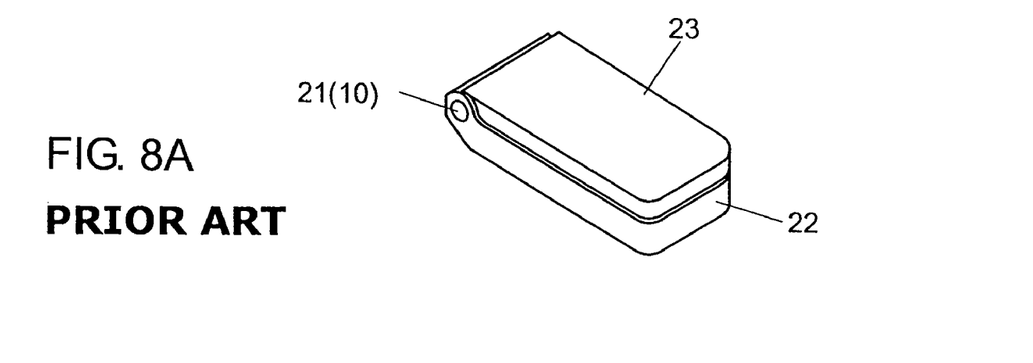
FIG. 8 is a perspective view of a mobile phone.

A conventional opening and closing device is described next with reference to FIGS. 8 to 10.

Figure 9:
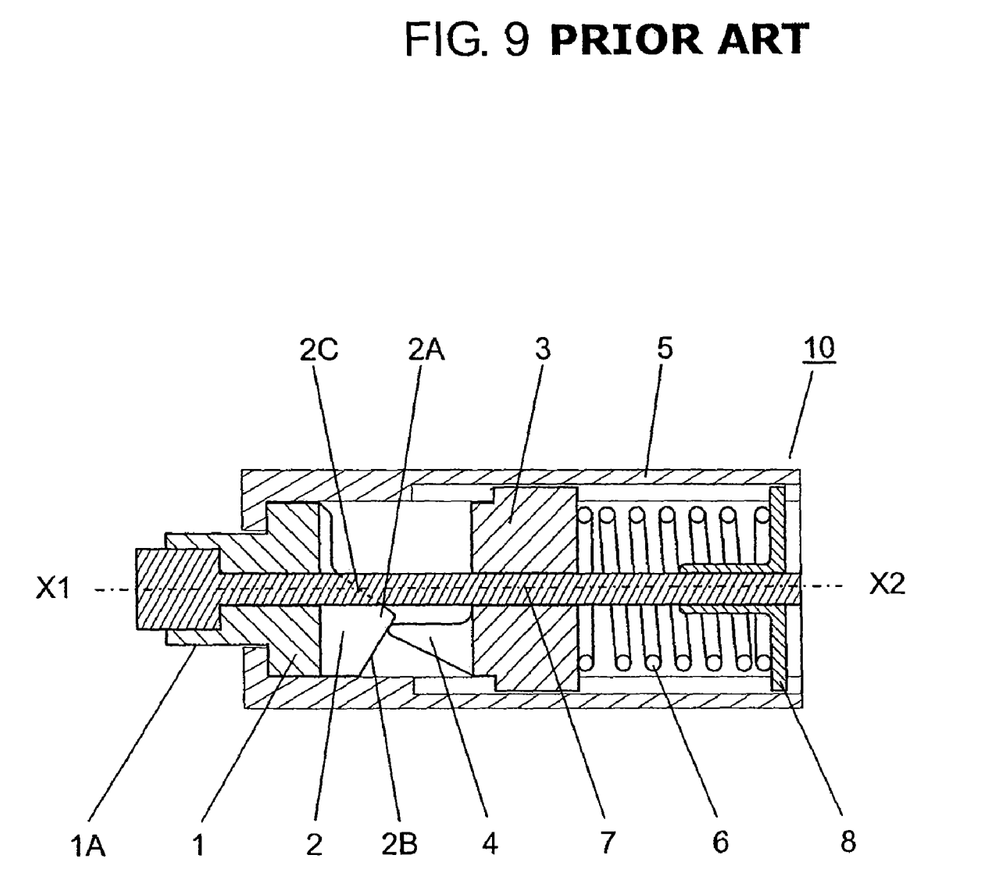
FIG. 9 is a sectional view of a conventional opening and closing device.

FIG. 9, a sectional view, is magnified radially for easier understanding of the relation between a stator cam and rotor cam. The central axis is indicated as X1-X2 for description.

Figure 10:
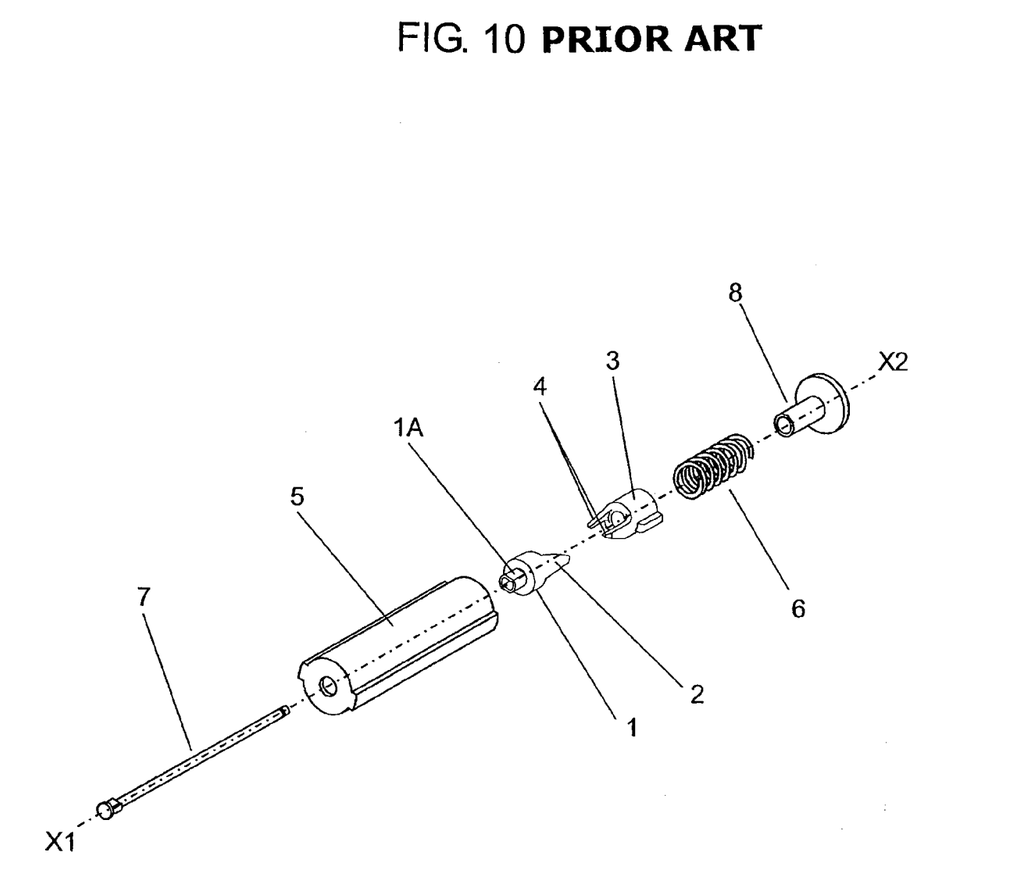
FIG. 10 is an exploded perspective view of the conventional opening and closing device.

FIG. 9 is a sectional view and FIG. 10 is an exploded perspective view of the conventional opening and closing device. Opening and closing device 10 has roughly cylindrical stator 1 and roughly cylindrical rotor 3.

Stator 1 includes fixed part 1A formed at its left end face, and a pair of opposed stator cams 2 on its outer periphery at the right end. Each of stator cams 2 includes protrusion 2A and tilting portions 2B and 2C extending from protrusion 2A.

Rotor 3 is disposed in a rotatable fashion in opening and closing directions and also in a movable fashion along center axis X1-X2 relative to stator 1. Rotor 3 includes a pair of rotor cams 4 opposed to each other relative to central axis X1-X2 on its outer periphery at the left end, which is a face opposed to stator 1.

Opening and closing device 10 also has roughly cylindrical case 5 and coil spring 6. Stator 1 and rotor 3 are housed in case 5. Spring 6 is set between a right end face of rotor 3 and an inner side face of case 5 in a little contracted state. This spring 6 applies a force toward X1 to rotor 3, and thus tips of rotor cams 4 resiliently contact tilting portions 2B of stator cams 2.

Opening and closing device 10 also has roughly columnar fixed shaft 7.

Stator 1 is secured to the left end of this fixed shaft 7. Fixed part 1A rotatably protrudes from a left end face of case 5. The right end of fixed shaft 7 passes through a hollow portion of rotor 3 and spring 6, and is secured to cover 8. Cover 8 is rotatably attached to case 5, and thus fixed shaft 7 is also rotatable relative to case 5.

An example of employing opening and closing device 10 in a mobile phone is described next.

Figure 8B:
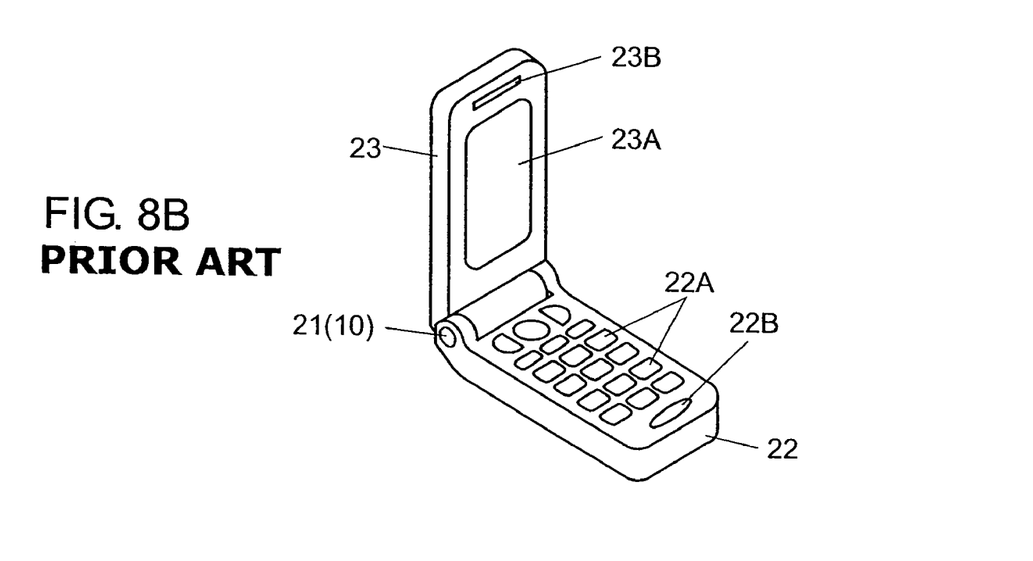
Figure 8C:
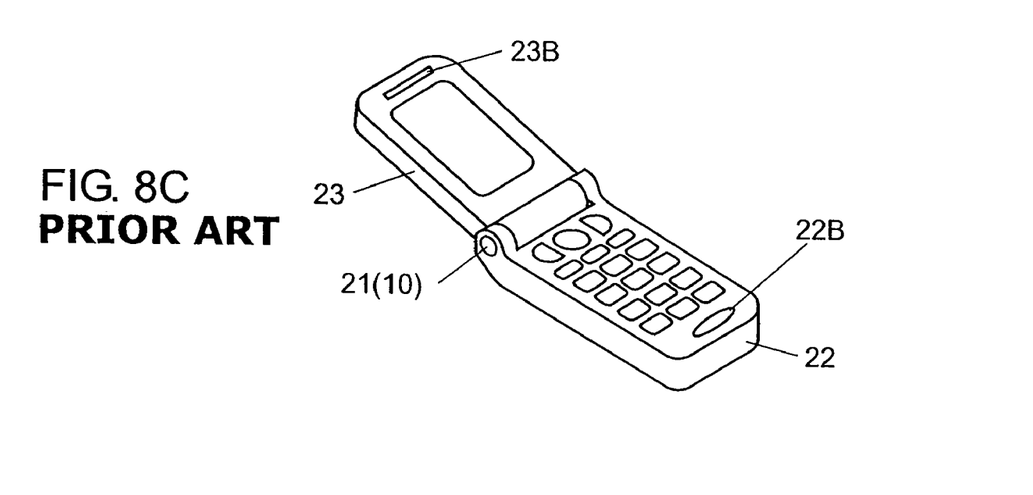

FIG. 8B is a perspective view of the mobile phone employing opening and closing device 10. Fixing part 1A of stator 1 is secured to fixed housing 22 where control panel 22A such as keys and sound input part 22B such as a microphone are formed on its top face. Case 5 is attached to movable housing 23 where display 23A such as LCD and sound output part 23B such as a speaker are formed on its surface. With this opening and closing device 10, movable housing 23 is journaled relative to fixed housing 22 in an openable and closable fashion in the mobile phone shown in FIG. 8B.

When movable housing 23 is closed relative to fixed housing 22, as shown in FIG. 8A, opening and closing device 10 is in the state shown in FIG. 9. More specifically, tips of rotor cams 4, to which spring 6 applies a force, resiliently contact lower tilting portions 2B of stator cams 2. Spring 6 applies a force toward X1 in a closing direction, which is downward in FIG. 9, to rotor 3. Consequently, a force in the closing direction is applied to movable housing 23 where case 5 is attached, and thus movable housing 23 is retained in a closed state.

When the movable housing 23 is opened by hand from this closed state, case 5 secured to movable housing 23 rotates, and rotor 3 rotates as it moves toward direction X2 inside case 5. As rotor 3 rotates, the tips of rotor cams 4 ride over projecting portions 2A of stator cams 2, and resiliently contact upper tilting portions 2C. At tilting portions 2C, spring 6 applies a force toward direction X1 in an opening direction to rotor 3. This spring force applies a force in the opening direction to movable housing 22. Accordingly, as show in FIG. 8C, movable housing 23 is opened at a predetermined angle relative to fixed housing 22. Here, the opening direction is equivalent to a counterclockwise rotation when the closing direction is a clockwise rotation relative to central axis X1-X2 seen from the X1 side. Contrary, the closing direction may be a counterclockwise rotation.

A separate stopper mechanism (not illustrated) may be provided between movable housing 23 and fixed housing 22 to retain movable housing 23 at an angle, for example 165°, which is convenient for conversation using sound input part 22B and sound output part 23B In other words, when case 5 attached to movable housing 23 is rotated while the tips of rotor cams 4 are resiliently contacting tilting portions 2B or 2C of stator cams 2, rotor 3 moves in the direction of central axis X1-X2, and rides over projecting portion 2A. When rotor 3 rides over projecting portion 2A, the tips of rotor cams 4 resiliently contact either tilting portions 2B or 2C, which are different from the initial state.

As described above, a pair of opposed rotor cams 4 are disposed on the outer periphery at the left end of rotor 3. These rotor cams resiliently contact and slide on the pair of stator cams 2 which are also opposed to each other. These tips of rotor cams 4 have a predetermined width in a circumferential direction although they are thinned widthwise in the circumferential direction compared to that of the base part. Accordingly, an angle that movable housing 23 opens relative to fixed housing 22 becomes smaller for the angle equivalent to the width of rotor cams 4.

More specifically, with conventional opening and closing device 10, movable housing 23 is impossible to open 180° relative to fixed housing 22. Practically, a width in the circumferential direction equivalent to about several tens of degrees is needed for rotor cams 4. Accordingly, a force toward the opening direction is not applied to case 5 attached to movable housing 23 when movable housing 23 is opened about 150°. The conventional opening and closing device is typically disclosed in Japanese Patent Unexamined Publication No. 2004-245342.

In the above conventional opening and closing device, no force toward the opening direction is applied when movable housing 23 is opened not less than 165° for a phone call. Accordingly, it is difficult to retain movable housing 23 at a predetermined angle relative to fixed housing 22. This often causes wobbling of movable housing 23 in the opening and closing direction.

SUMMARY OF THE INVENTION

An opening and closing device of the present invention includes a roughly cylindrical stator, a concavo-convex stator cam provided at an end of the stator, a ring-like rotor rotatably disposed relative to the stator, a rotor cam opposedly protruding toward inner or outer periphery of the rotor, and a spring pushing the rotor against the stator. The rotor cam slides on the concavo-convex stator cam during opening and closing operations. This allows opening and closing operations up to almost 180°, and also applies a force in the opening direction to the movable housing even when the device is opened not less than 165°. Accordingly, the present invention offers an opening and closing device which eliminates wobbling in the opening and closing direction, and ensures reliable opening and closing operations and retention at a predetermined angle.

Another embodiment of the present invention is that two roughly semi-cylindrical stators are coupled to configure the stator. The use of two stators for configuring the stator which has a complicated structure of the concavo-convex stator cam at its end facilitates the manufacture of the stator typically using pressing or molding.

Additional objects and advantages of the present invention will be apparent from the following detailed description of preferred embodiments thereof, which are best understood with reference to the accompanying drawings.

DETAILED DESCRIPTION OF THE INVENTION

Preferred embodiments of the present invention are described below with reference to FIGS. 1 to 8.

Figure 1:
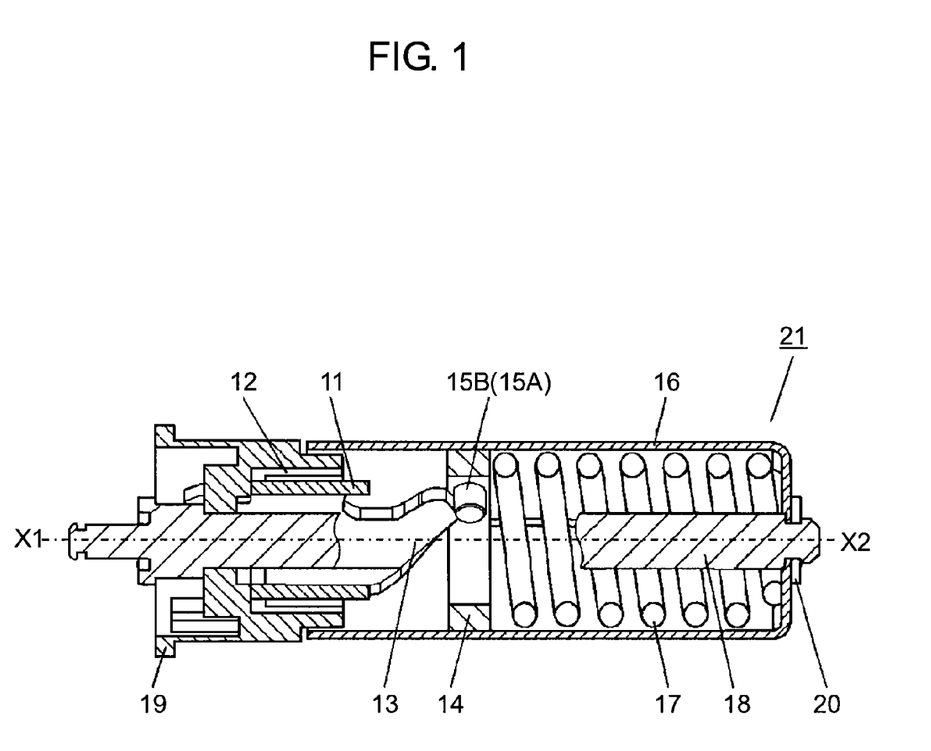
FIG. 1 is a transparent sectional view of an opening and closing device in accordance with the first embodiment of the present invention.

In FIG. 1, a sectional view, radial dimensions are magnified for easier understanding of the relation between a stator cam and rotor cam.

Components of the structure which are the same as those described in the prior art are given the same reference numerals to omit their detailed description.

First Embodiment

The first embodiment is described below with reference to FIGS. 1 to 5.

Figure 2:
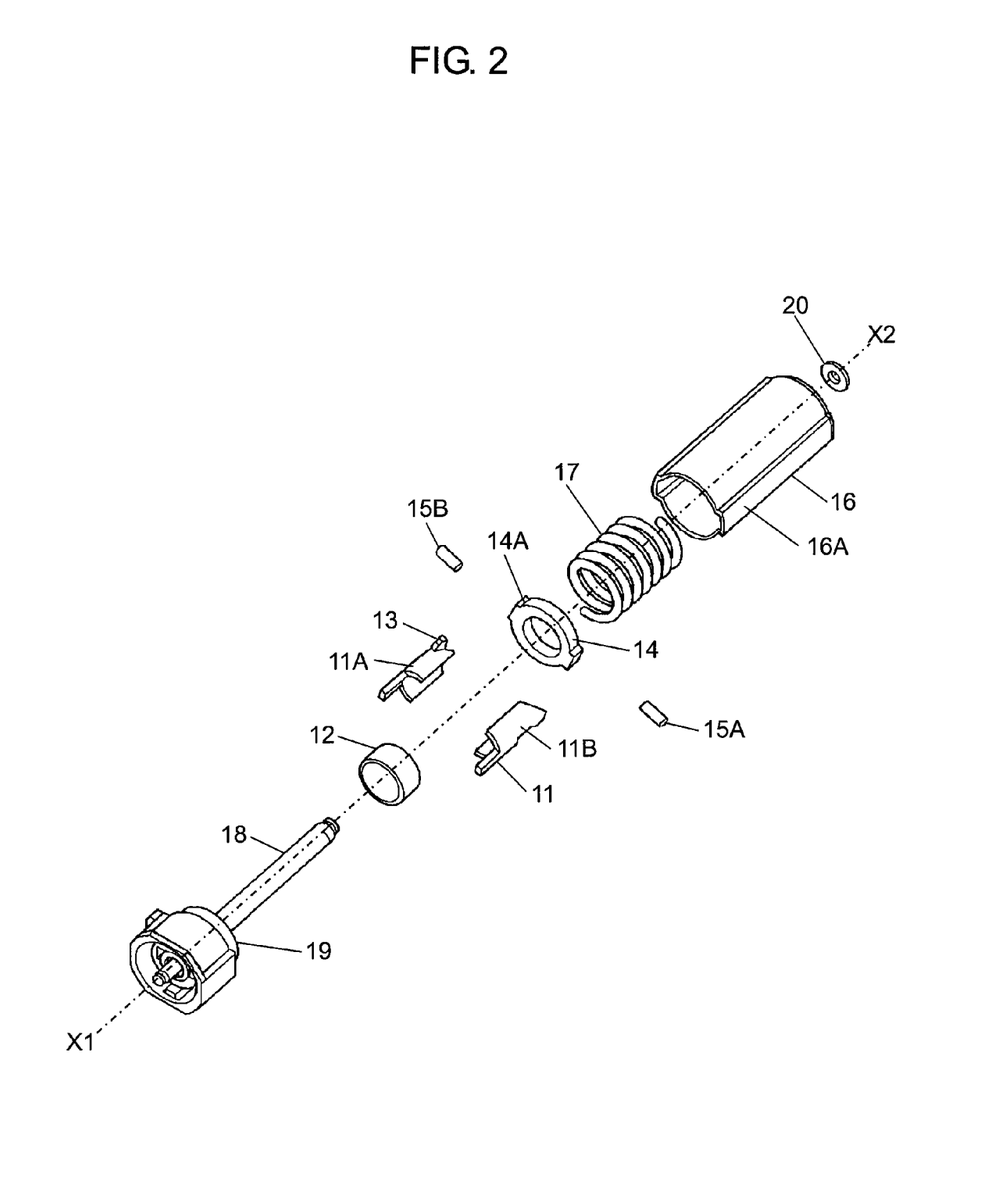
FIG. 2 is an exploded perspective view of the opening and closing device in accordance with the first embodiment of the present invention.
Figure 5:
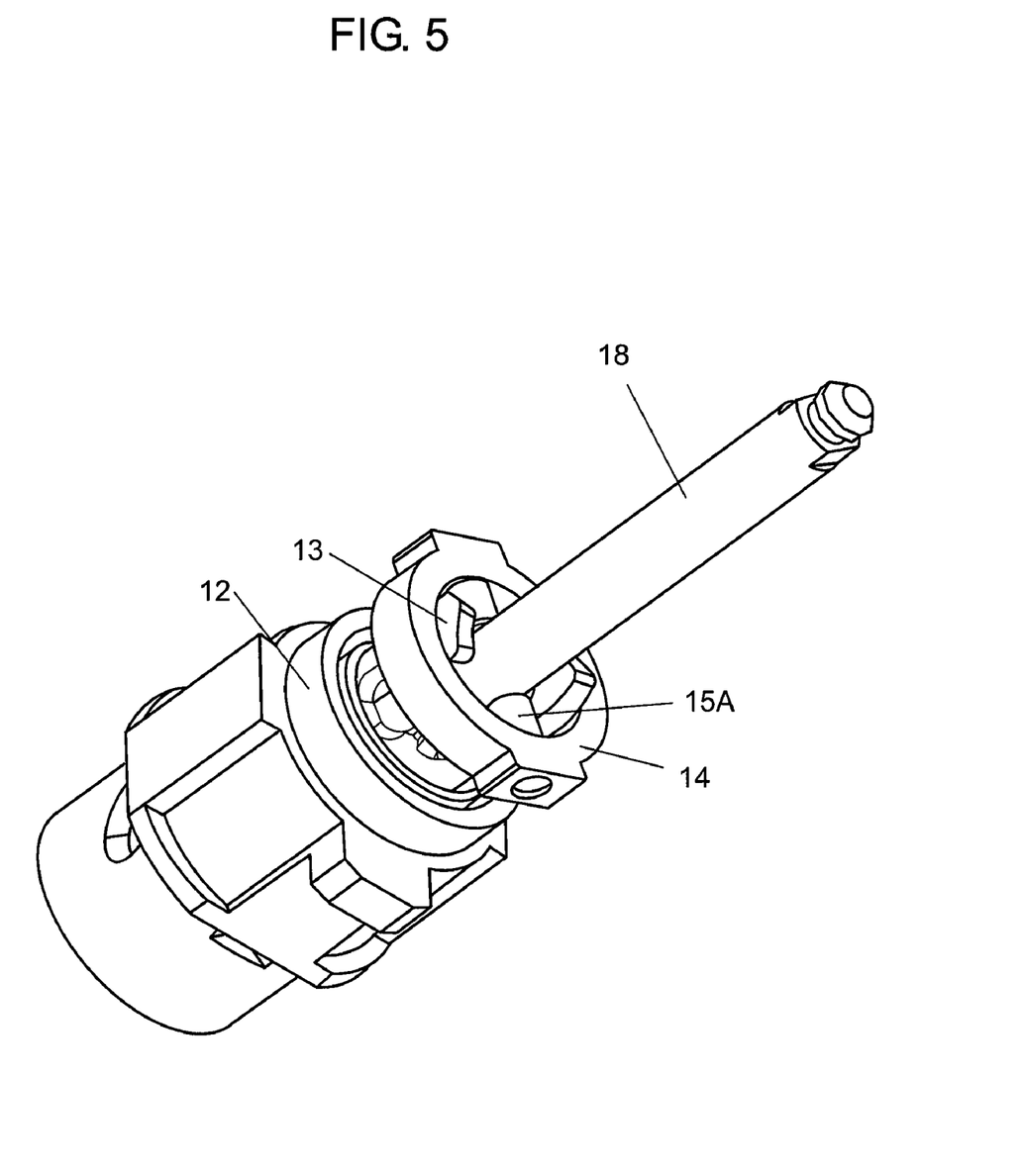
FIG. 5 is a perspective view of a key part of the opening and closing device in accordance with the first embodiment of the present invention.

FIG. 1 is a sectional view and FIG. 2 is an exploded perspective view of opening and closing device 21 in the first embodiment of the present invention. FIG. 5 is a perspective view illustrating assembled stator 13, rotor 14, and fixed shaft 18. In the drawings, a central axis is indicated as X1-X2 for description.

Opening and closing device 21 has stator 11 including first stator 11A and second stator 11B. Both first stator 11A and second stator 11B are roughly semi-cylindrical, and are made typically of steel, copper alloy, or sintered alloy. Left ends (at the X1 side) of first stator 11A and second stator 11B are inserted to tube 12, and these stators are integrated to form roughly cylindrical stator 11.

Figure 3:
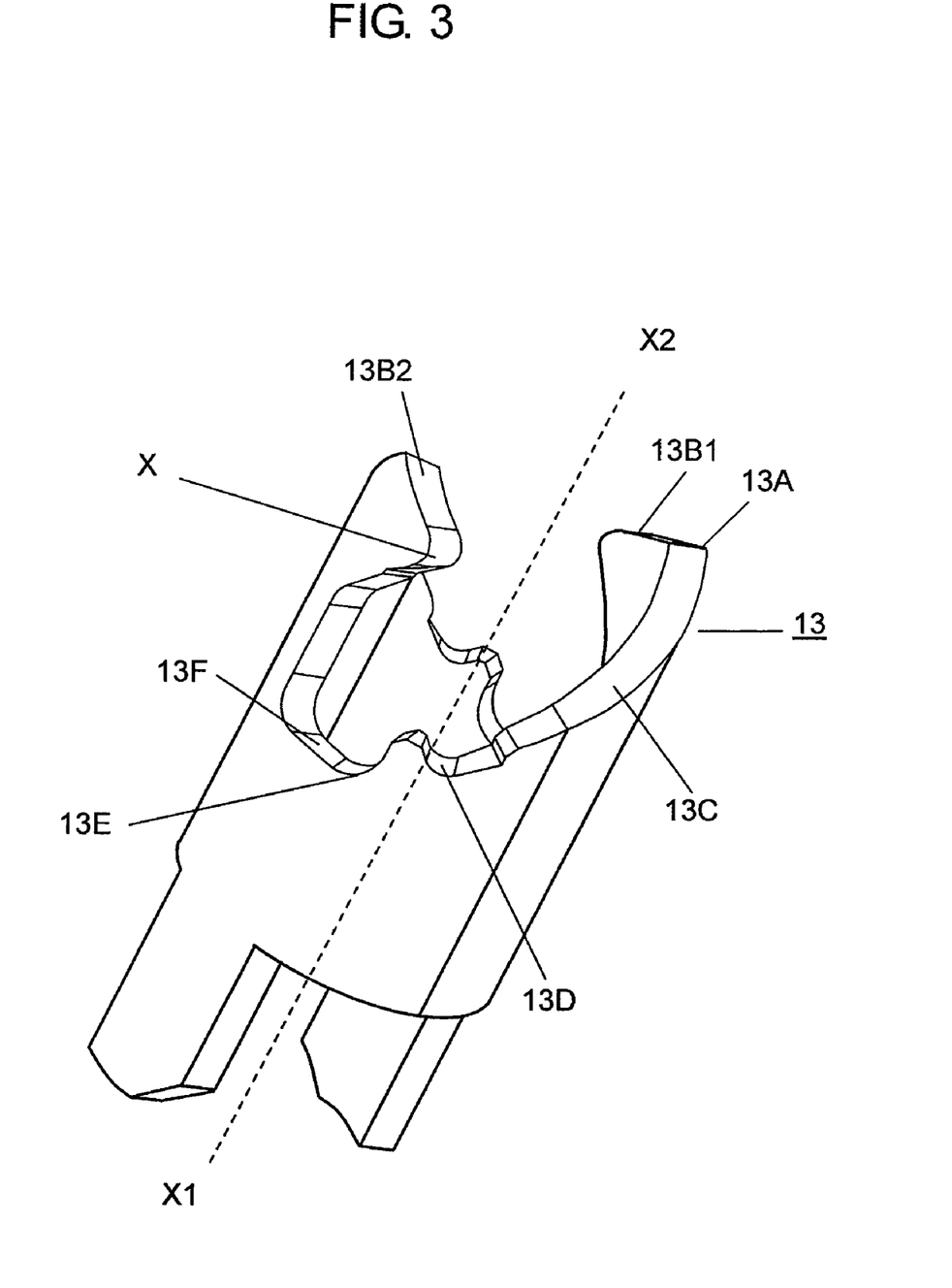
FIG. 3 is a perspective view of a key part of the opening and closing device in accordance with the first embodiment of the present invention.
Figure 3A:
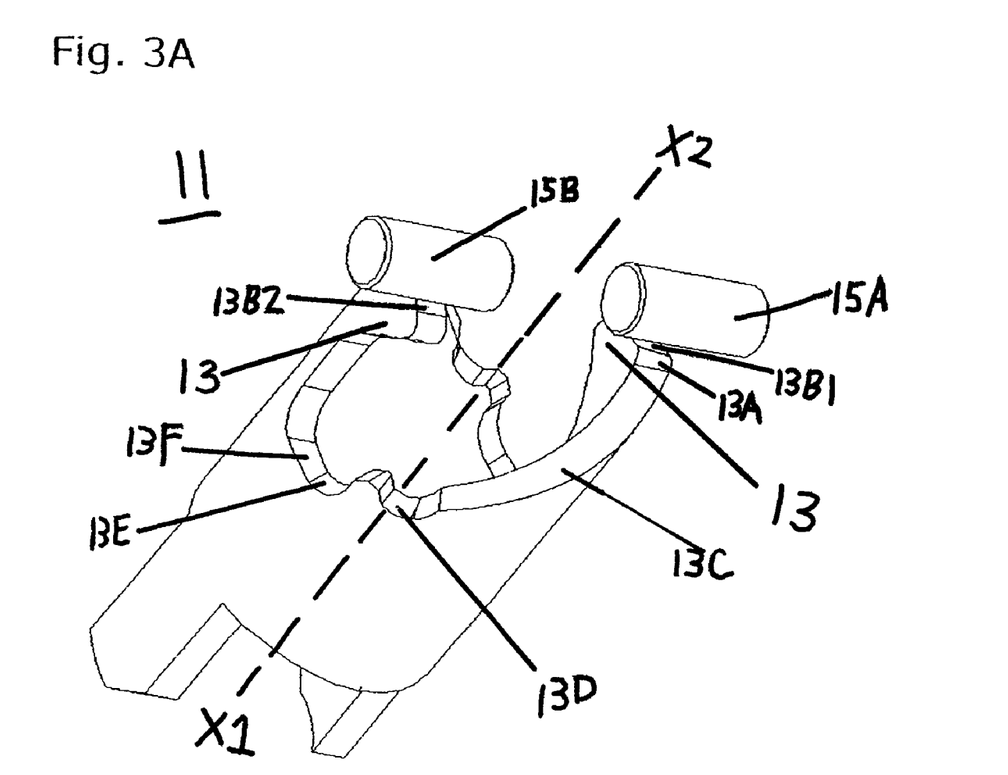
FIG. 3A is a perspective view of an alternative key part of the opening and closing device in accordance with the first embodiment of the present invention.
Figure 4A:
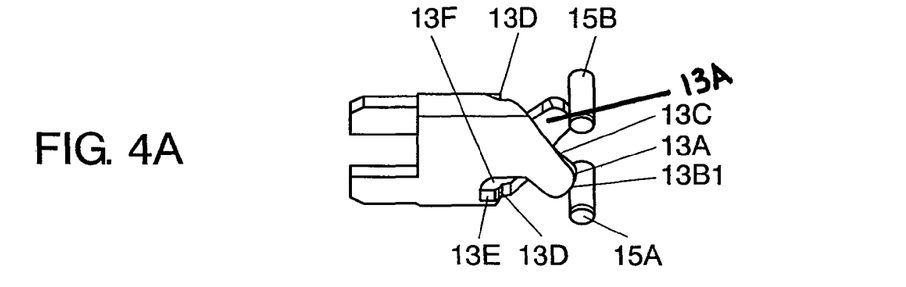
FIG. 4 is a fragmentary perspective view illustrating an operation of the opening and closing device in accordance with the first embodiment of the present invention.
Figure 4B:
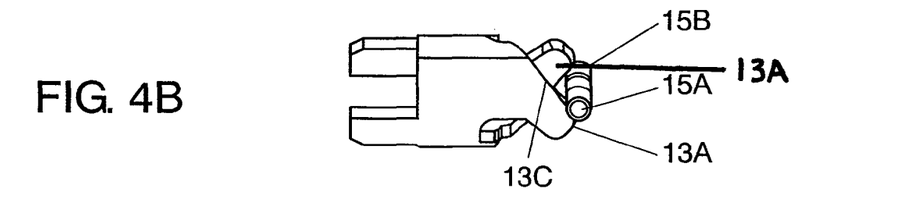

As shown in FIGS. 3 and 4A, a pair of opposed concavo-convex stator cam profiles 13 are provided on an end of stator 11 at the X2 side. Stator cam profiles 13 (hereinafter referred to as "stator cams") are configured by continuously forming projecting portion 13A, first tilting portion 13B1 and second tilting portion 13C extending from this projecting portion 13A to both sides in a circumferential direction, second concave portion 13D extending from second tilting portion 13C, third tilting portion 13E extending from second concave portion 13D, and first concave portion 13F extending from third tilting portion 13E. The 'X' in FIG. 3 indicates a projecting surface.

First concave portion 13F is formed at a position roughly same as first tilting portion 13B2 at the right with respect to a direction parallel to central axis X1-X2. In other word, the first tilting portion 13B2 and the first concave portion 13F are disposed at roughly the same position on an axis which is parallel to the central axis X1-X2. Stator cam 13 without second concave portion 13D is also one of embodiments of the present invention.

Rotor 14 is made of metal, and has a ring-like shape. Rotor 14 is disposed in a way such that it is movable in the direction of central axis X1-X2 relative to stator 11, and is also rotatable in the opening and closing direction. A pair of rotor cams 15A and 15B are disposed toward an inner periphery of rotor 14. These rotor cams 15A and 15B are formed as diametrically opposed protrusions protruding toward the inner periphery of rotor 14. Here, the opening and closing direction corresponds to a rotating direction around central axis X1-X2. Rotor cams 15A and 15B are protrusions formed on a side face of rotor 14. Protrusions which act as rotor cams 15A and 15B preferably have at least round faces at which stator cams 13 contact. The round face means the face is curved.

Opening and closing device 21 has roughly cylindrical metal case 16 and coil spring 17 made of steel wire. Case 16 houses stator 11 and rotor 14. Spring 17 is fitted in a little contracted state between an end face of rotor 14 at the X2 side and an inner side face of case 16. Spring 17 applies a force to rotor 14 toward X1, and makes rotor cams 15A and 15B resiliently contact first tilting portions 13B1 and 13B2.

A pair of grooves 16A are formed in case 16 in a way protruding outward, and a pair of convex portions 14A protruding outward are formed on an outer periphery of rotor 14. Rotor 14 is movable along central axis X1-X2 relative to case 16 by fitting convex portions 14A into grooves 16A. In addition, convex portions 14A and grooves 16A rotate integrally around central axis X1-X2 in the rotating direction.

Opening and closing device 21 further has roughly columnar fixed shaft 18 and fixed cover 19. The left end of fixed shaft 18 and stator 11 are secured to fixed cover 19. The right end of fixed shaft 18 is inserted through the hollow section of rotor 14 and spring 17, and rotatably attached to an outer side face of case 16 by stopper ring 20. Accordingly, fixed shaft 18 does not move along central axis X1-X2 relative to case 16, but is rotatable around central axis X1-X2 relative to case 16.

If stator 11 with complicated concavo-convex stator cams 13 at its end is fabricated typically by pressing or molding, a mold structure and adjustment tend to become complicated and troublesome. Accordingly, in this embodiment, stator cams 13 are configured by coupling two roughly semi-cylindrical first stator 11A and second stator 11B, and tube 12. This structure relatively facilitates the manufacture of stator 11.

Rotor 14 is a thin ring-like plate, and a pair of rotor cams 15A and 15B are protrusions opposedly protruding toward the inner periphery of rotor 14. On the other hand, in case of conventional opening and closing device 10, as shown in FIG. 9, a pair of rotor cams 4 protrude at the left end of rotor 3 facing stator cams 2. Accordingly, opening and closing device 21 in this embodiment is shorter than conventional opening and closing device 10 with respect to the total length in the direction of central axis X1-X2. The device can thus be downsized. Here, rotor cams 15A and 15B are protrusions whose side faces contacting stator cam 13 are preferably curved. One example of the protrusions with a curved side face is a columnar shape. However, the shape is not limited to the columnar shape. For example, a semi-columnar shape is also applicable.

Next, the operation of opening and closing device 21 is described using an example of employing opening and closing device 21 in the first embodiment in a mobile phone.

As shown in a perspective view of the mobile phone in FIG. 8B, fixed cover 19 is attached to fixed housing 22 where control panel 22A such as keys and sound input part 22B such as a microphone are formed on its top face. Case 16 is attached to movable housing 23 where display 23A such as LCD and sound output part 23B such as a speaker are formed on its surface. With this opening and closing device 21, movable housing 23 is journaled relative to fixed housing 22 in an openable and closable fashion, configuring the electronic device.

In the above structure, opening and closing device 21 retains the state shown in FIGS. 1 and 4A when movable housing 23 is in a closed state relative to fixed housing 22, as shown in FIG. 8A. To make the description clearer, a direction along the central axis is defined as direction X1-X2 and a direction perpendicular to this central axis direction X1-X2 is defined as directions Z1 and Z2, as shown in FIG. 4E. This definition is common to FIGS. 4A to 4E.

Rotor cams 15A and 15B resiliently contact first tilting portions 13B1 and 13B2 respectively of stator cams 13, and spring 17 applies a force in a closing direction (direction Z1 in FIG. 4E) to rotor 14. Here, the force in the closing direction of rotor 14 is a force toward rotating rotor 14 around central axis X1-X2. By this force in the closing direction of rotor 14, a force in the closing direction is further applied to movable housing 23 to which case 16 is attached. Accordingly, movable housing 23 is consistently retained in a closed state.

When movable housing 23 is opened by hand from this closed state, case 16 attached to movable housing 23 rotates. Rotor 14 rotates as it moves in central axis direction X1-X2, and becomes the state shown in FIG. 4B. At this point, one rotor cam 15A rides over protrusion 13A from the position of first tilting portion 13B1 in the closed state, moves in direction Z2, and resiliently contact second tilting portion 13C. When rotor cam 15A resiliently contacts second tilting portion 13C, spring 17 applies a force to rotor 14 in a direction of opening. This force applies a force in the opening direction to movable housing 23, and thus movable housing 23 starts to open, as shown in FIG. 8B.

Figure 4C:
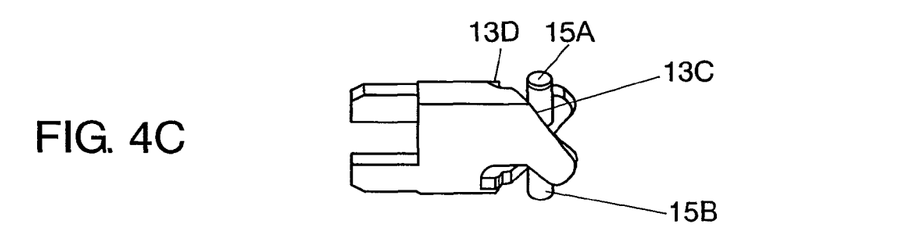

Next, as shown in FIG. 4C, spring 17 applies a force to rotor cams 15A and 15B in a way such that they resiliently contact and slide on second tilting portion 13C. At this point, rotor cam 15A moves, for example, in direction X1 and also in direction Z2 in FIG. 4B.

Figure 4D:
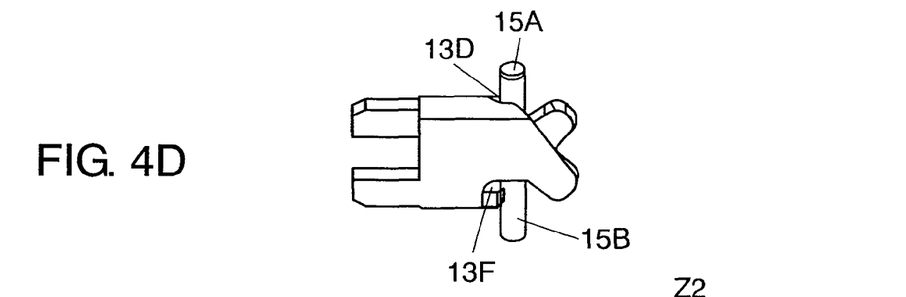
Figure 4E:
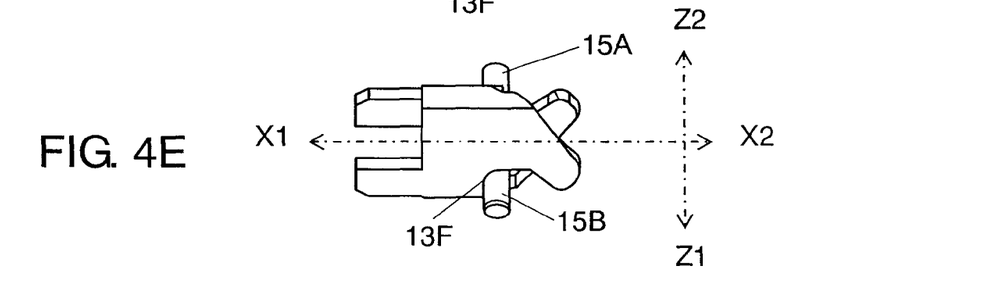

As shown in FIG. 4D, movable housing 23 to which case 16 is attached stops opening at a predetermined angle, for example 130°, where rotor cams 15A and 15B resiliently contact second concave portion 13D.

When movable housing 23 is further opened by hand from this state, rotor cams 15A and 15B move from second concave portion 13D, and resiliently contact third tilting portion 13E. Rotor 14 is given a force in the opening direction again, and movable housing 24 further opens. Then, the rotation of rotor 14 stops when rotor cams 15A and 15B resiliently contact first concave portion 13F, as shown in FIG. 4E, which is the state of 180° rotation in this embodiment.

In other words, case 16 attached to movable housing 23 rotates by opening or closing movable housing 23. When case 16 rotates, rotor 14 moves in the direction of central axis X1-X2, and rotor cams 15A and 15B given force by spring 17 move on stator cam 13 while they resiliently contact stator cams 13.

Alternatively, a separate stopper mechanism (not illustrated) may be provided between movable housing 23 and fixed housing 22 to retain movable housing 23 at a predetermined opening angle instead of rotating roughly 180° as in opening and closing device 21 described above. As for the predetermined opening angle, a stopper may be provided to stop and retain movable hosing 23 at 165°, for example, which is an angle convenient for making calls using sound input part 22B and sound output part 23B. An angle to stop and retain this movable housing 23 is adjustable to other than 165° by changing the angular position of first concave portion 13F.

Accordingly, when movable housing 23 is opened 165°, rotor cams 15A and 15B of opening and closing device 21, which is rotatable up to roughly 180°, resiliently contact third tilting portion 13E. This structure retains movable housing 23 without any wobbling in the opening and closing direction because the stopper mechanism stops the movement of movable housing 23 while a force in the opening direction is applied to rotor 14.

As described above, opening and closing device 21 in the first embodiment has rotor cams 15A and 15B which are opposed protrusions protruding toward the inner periphery of ring-like rotor 14. Opening and closing device 21 is opened and closed by sliding these rotor cams 15A and 15B while they resiliently contact concavo-convex stator cams 13 provided at the end of roughly cylindrical stator 11. This structure enables rotation of opening and closing device 21 up to roughly 180°. In addition, this structure reliably retains the open state of movable housing 23 typically of a mobile phone to which opening and closing device 21 is attached without any wobbling in the opening and closing direction even when movable housing 23 is opened not less than 165°.

Still more, rotor 14 is designed as a thin ring-like plate, and pair of rotor cams 15A and 15B are designed as protrusions opposedly protruding toward the inner periphery of rotor 14. This enables shortening of the total length of opening and closing device 21 in the axial direction, achieving a smaller opening and closing device 21.

Still more, stator 11, to which complicated concavo-convex stator cams 13 are provided at its end, is configured with two roughly semi-cylindrical pieces of first stator 11A and second stator 11B, and these first stator 11A and second stator 11B are coupled using tube 12. This structure relatively facilitates the manufacture of stator 11 by using typically pressing or molding.

In the structure described above of the preferred embodiment, rotor 14 has a ring-like shape, and its inner diameter is larger than an outer diameter of stator 11. This rotor 14 has a pair of rotor cams 15A and 15B which are protrusions protruding toward its inner periphery in the diametric direction. (See FIG. 5.)

Other than this structure, the inner diameter of stator 11 can be designed larger than the outer diameter of rotor 14, and a pair of protrusions which protrude from the surface of ring-like rotor 14 outward in the diametric direction may be provided as rotor cams 15A and 15B. In case of this structure, rotor 14 and spring 17 applying a force to rotor 14 may be fitted inside stator 11 so as to make rotor cams 15A and 15B resiliently contact stator cam 13. In addition, tips of rotor cams 15A and 15B may be fitted into groove 16A in case 16.

In the above description, rotor cams 15A and 15B which are a pair of protrusions are secured to rotor 14. However, rotor cams 15A and 15B may also be integrally formed with rotor 14 by making protrusion on rotor 14 by metal injection molding or forging.

Furthermore, stator 11 including a pair of stator cams 13 may be fabricated by pressing to form stator 11 in a developed shape from a single flat metal sheet, bending it to a cylindrical shape, and then bonding both ends of the flat sheet typically by welding.

Second Embodiment

Another embodiment of a rotor and stator is described below using the second embodiment. Same reference numerals are given to the parts identical to that of the first embodiment for simplifying the description.

Figure 6:
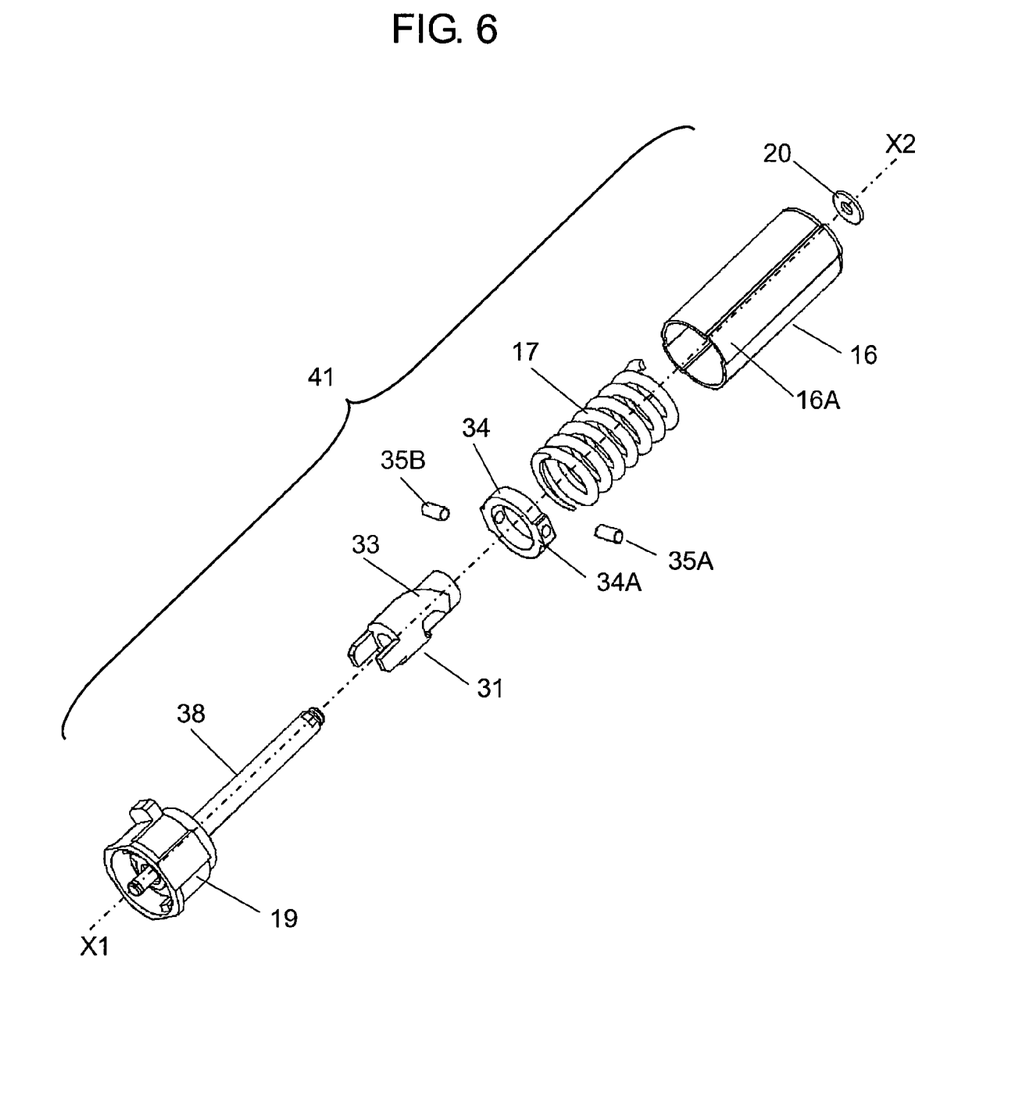
FIG. 6 is an exploded perspective view of an opening and closing device in accordance with the second embodiment of the present invention.
Figure 7:
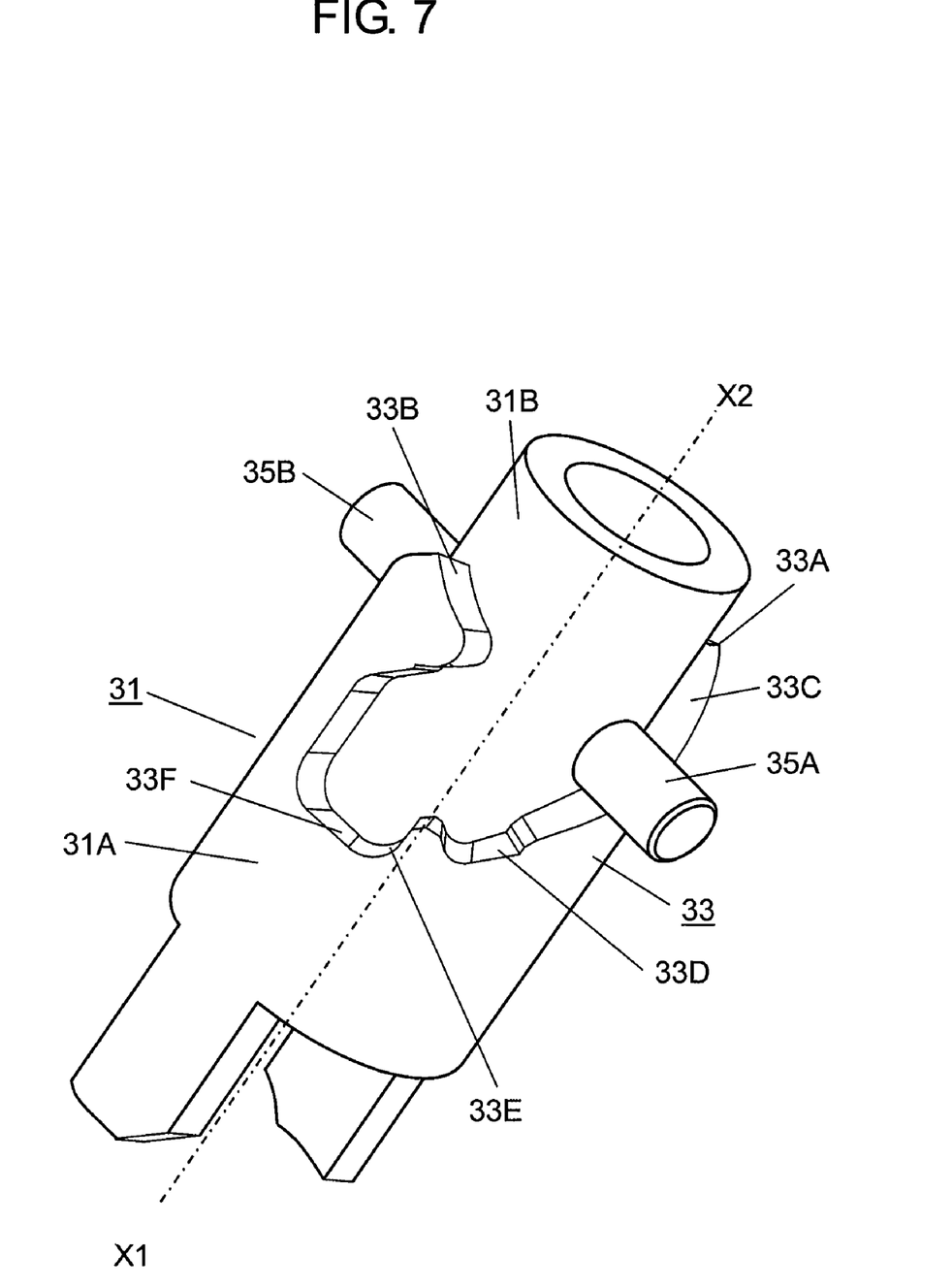
FIG. 7 is a perspective view of a key part of the opening and closing device in accordance with the second embodiment of the present invention.

FIG. 6 is an exploded perspective view and FIG. 7 is a perspective view of a key part of opening and closing device 41 in the second embodiment of the present invention.

Stator 31 is roughly cylindrical, and is made of metal, typically steel, copper alloy, or sintered alloy, or highly-rigid resin. When metal is used, stator 31 can be fabricated typically by metal injection molding, cutting, or forging. When resin is used, stator 31 can be fabricated by injection molding.

Stator 31 has first tubular part 31A at its outside and second tubular part 31B inside first tubular part 31A. A pair of opposed stator cams 33 are provided at an end of first tubular part 31A. Each of stator cams 33 has a concavo-convex shape configured by continuously forming protrusion 33A, first tilting portion 33B and second tilting portion 33C extending from protrusion 33A to both sides, second concave portion 33D extending from second tilting portion 33C, third tilting portion 33E, and first concave portion 33F.

Ring-like rotor 34 is disposed rotatable in the opening and closing direction and movable in a direction of central axis X1-X2 relative to stator 31. A pair of protrusions are formed on rotor 34 to configure rotor cams 35A and 35B. These rotor cams 35A and 35B are protruding toward an inner periphery of rotor 34, which is same as that in the first embodiment.

Stator 31, rotor 34, and spring 17 are housed inside roughly cylindrical case 16. Spring 17 applies a force in direction X1 to rotor 34, and rotor cams 35A and 35B resiliently contact stator cams 33, which are also the same as that in the first embodiment.

In addition, same as the first embodiment, convex portion 34A protruding outward from an outer periphery of rotor 34 is fitted into groove 16A protruding outward in case 16. Rotor 34 is movable in the direction of central axis X1-X2 relative to case 16, and rotor 34 and case 16 are integrally rotatable. The left end of fixed shaft 38 and stator 31 are secured to fixed cover 19. The right end of fixed shaft 38 is inserted through a hollow section of rotor 34 and spring 17, and rotatably attached to an outer end of case 16 by stopper ring 20, configuring opening and closing device 41.

In other words, a pair of stator cams 33 are formed on first tubular part 31A at the outer periphery side of stator 31 in the second embodiment, whereas a pair of concavo-convex stator cams 13 are formed at the right end of stator 11 in the first embodiment.

Opening and closing device 41 in the second embodiment is attached to fixed housing 2 and movable housing 23 of a mobile phone. Case 16 rotates as movable housing 23 is opened or closed, and rotor cams 35A and 35B slides on stator cams 33 while resiliently contacting stator cams 33. When movable housing 23 is opened or closed relative to fixed housing 22, rotor cams 35A and 35B slides on stator cams 33, allowing opening up to roughly 180°.

As described above, stator 31 includes first tubular part 31A and second tubular part 31B, and stator cams 33 are formed on an end face of first tubular part 31A outside. An inner diameter of second tubular part 31B is smaller than an outer diameter of rotor 34, and rotor cams 35A and 35B protrude toward the inner periphery from the surface of rotor 34. Same as in the first embodiment, the structure of this embodiment applies a force in the opening direction to the movable housing even when it is opened not less than 165°, and thus there is no wobbling in the opening and closing direction. Accordingly, the second embodiment offers an opening and closing device that ensures reliable opening and closing operation and retention at a predetermined angle.

Alternatively, stator 31 includes first tubular part 31A and second tubular part 31B, and stator cams 33 may be formed on an end face of second tubular part 31B inside. In this case, the inner diameter of second tubular part 31B is set larger than the outer diameter of rotor 34, and rotor cams 35A and 35B protrude outward from the surface of rotor 34. In this case, rotor 34 is housed inside stator 31, and rotor cams which are protrusions protruding outward from the outer periphery of rotor 31 resiliently contact the stator cam on the inner periphery of the stator. This structure also makes the present invention feasible.

In the above description, movable housing 23 is opened or closed by hand to rotate case 16 attached to movable housing 23. In addition to manual opening and closing operations, an inverter cam for inverting a resilient contact point of the rotor cam and the stator cam, and a component such as a button for pushing this inverter cam may be provided so as to automatically open movable housing 23 by pushing the button in the closed state. In other words, the present invention is also applicable to an opening and closing device with a so-called one-touch-open structure.

It will be obvious to those skilled in the art that various changes may be made n the above-described embodiments of the present invention. However, the scope of the present invention is determined by the following claims.

What is claimed is:

1. An opening and closing device comprising:
a roughly cylindrical stator;
a pair of stator cam profiles formed at an end of the stator parallel to a central axis of the stator, the stator cam profiles radially opposing each other;
a roughly ring-like rotor sharing the central axis with the stator, the rotor having a substantially planar axial surface proximal to the stator and a substantially planar axial surface distal to the stator, the rotor further having an inner circumferential surface that defines an axial space;

the rotor being rotatable relative to the stator and movable along the central axis;

a pair of rotor cams protruding orthogonally from the inner circumferential surface of the rotor toward the central axis of the stator; and a spring pushing the rotor against the stator, the spring resiliently contacting the distal axial surface of the rotor;

wherein the spring pushes each of the pair of rotor cams against each of the pair of stator cam profiles, at least a part of the stator is movable into the axial space defined by the inner circumferential surface of the rotor, and a diameter of the axial space of the rotor is larger than an outer diameter of the stator, a side face of the rotor cams contacting the stator cam profiles is round, each of the rotor cams reciprocally slides on the pair of stator cam profiles, and each stator cam profile is a concavo-convex cam profile configured by continuously forming a projecting portion, a first tilting portion and a second tilting portion extending from the projecting portion to both sides in a circumference direction, a third tilting portion extending from the second tilting portion, and a first concave portion extending from the third tilting portion, and a projecting surface of the first tilting portion of one of the pair of stator cam profiles and a surface of the first concave portion of the other of the pair of stator cam profiles are aligned along an axis which is parallel to the central axis of the stator, wherein at a point in the rotation of the rotor relative to the stator, at least a part of the pair of stator cam profiles extends through the axial space of the rotor from the proximal axial surface to the distal axial surface.

2. The opening and closing device of claim 1, wherein the stator includes two roughly semi-cylindrical stators coupled to each other.

3. The opening and closing device of claim 1, wherein the stator includes a first tubular part and a second tubular part inside the first tubular part, each of the pair of stator cam profiles are formed on an end face of the first tubular part.

4. The opening and closing device of claim 1, wherein each of the pair of stator cam profiles have a second concave portion between the second tilting portion and the third tilting portion.

5. An opening and closing device comprising:
a roughly cylindrical stator;
a stator cam profile formed at an end of the stator parallel to a central axis of the stator;
a roughly ring-like rotor sharing the central axis with the stator, the rotor having a substantially planar axial surface proximal to the stator and a substantially planar axial surface distal to the stator, the rotor further having an inner circumferential surface that defines an axial space;
the rotor being rotatable relative to the stator and movable along the central axis;
a pair of rotor cams protruding orthogonally from the inner circumferential surface of the rotor toward the central axis of the stator, each rotor cam having a width in the direction of the central axis, the width of each rotor cam extending most of an axial length of the rotor; and
a spring pushing the rotor against the stator, the spring resiliently contacting a the distal axial surface of the rotor;
wherein the spring pushes the rotor cams against the stator cam profile,
at least a part of the stator is movable into the axial space defined by the inner circumferential surface of the rotor, and
a diameter of the axial space of the rotor is larger than an outer diameter of the stator, a side face of the rotor cams contacting the stator cam profile is round, each of the rotor cams reciprocally slides on the stator cam profile, and the stator cam profile is a concavo-convex cam profile configured by continuously forming a projecting portion, a first tilting portion and a second tilting portion extending from the projecting portion to both sides in a circumference direction, a third tilting portion extending from the second tilting portion, and a first concave portion extending from the third tilting portion,
wherein at a point in the rotation of the rotor relative to the stator, at least a part of the stator cam profile extends through the axial space of the rotor from the proximal axial surface to the distal axial surface.

6. The opening and closing device of claim 5, wherein the stator is formed by coupling two roughly semi-cylindrical stators.

7. The opening and closing device of claim 5, wherein the stator includes a first tubular part and a second tubular part inside the first tubular part, the stator cam profile is formed on an end face of the first tubular part.

8. The opening and closing device of claim 5, wherein the stator cam profile has a second concave portion between the second tilting portion and the third tilting portion.

9. The opening and closing device of claim 5, wherein the stator has a pair of stator cam profiles, and the first tilting portion of one of the stator cam profiles and the first concave portion of an other of the stator cam profiles are disposed at roughly the same position on an axis which is parallel to the central axis of the stator.

10. An opening and closing device comprising:
a roughly cylindrical stator;
a pair of stator cam profiles formed at an end of the stator parallel to a central axis of the stator, the stator cam profiles radially opposing each other;
a roughly ring-like rotor sharing the central axis with the stator;
the rotor being rotatable relative to the stator and movable along the central axis;
a pair of rotor cams protruding orthogonally from an inner circumferential surface of the rotor toward the central axis of the stator; and
a spring pushing the rotor against the stator;
wherein the spring pushes each of the pair of rotor cams against each of the pair of stator cam profiles,
at least a part of the stator is movable into a space within the inner circumferential surface of the rotor, and
an inner diameter of the rotor is larger than an outer diameter of the stator, a side face of the rotor cams contacting the stator cam profiles is round, each of the rotor cams reciprocally slides on the pair of stator cam profiles, and each stator cam profile is a concavo-convex cam profile including a first projecting portion, a first tilting portion and a second tilting portion extending from the first projecting portion to both sides in a circumference direction, a second projecting portion, a third tilting portion and a fourth tilting portion extending from the second projecting portion to both sides in a circumference direction, a first concave portion extending from the third tilting portion, and a second concave portion extending between the second tilting portion and the fourth tilting portion, and a projecting surface of the first tilting portion of one of the pair of stator cam profiles and a surface of the first concave portion of the other of the pair of stator cam profiles are aligned along an axis which is parallel to the central axis of the stator.

* * * * *